(12) United States Patent
Lopez Lavernia et al.

(10) Patent No.: US 10,316,198 B2
(45) Date of Patent: Jun. 11, 2019

(54) SLIP AND PROCESS FOR PRODUCING AN OXIDATION- AND CORROSION-RESISTANT DIFFUSION LAYER

(71) Applicant: MTU Aero Engines AG, Munich (DE)

(72) Inventors: Natividad Lopez Lavernia, Munich (DE); Michael Hillen, Olching (DE); Horst Pillhoefer, Roehrmoos (DE); Anja Kliewe, Fuerstenfeldbruck (DE)

(73) Assignee: MTU AERO ENGINES AG, Munich (DE)

( * ) Notice: Subject to any disclaimer, the term of this patent is extended or adjusted under 35 U.S.C. 154(b) by 628 days.

(21) Appl. No.: 14/886,381

(22) Filed: Oct. 19, 2015

(65) Prior Publication Data

US 2016/0122555 A1    May 5, 2016

(30) Foreign Application Priority Data

Oct. 29, 2014 (DE) .......... 10 2014 222 024

(51) Int. Cl.
| | |
|---|---|
| *C23C 10/32* | (2006.01) |
| *C23C 4/123* | (2016.01) |
| *C09D 5/10* | (2006.01) |
| *C09D 129/04* | (2006.01) |
| *C22C 30/00* | (2006.01) |
| *C23C 10/26* | (2006.01) |
| *C23C 4/00* | (2016.01) |
| *C23C 10/00* | (2006.01) |

(52) U.S. Cl.
CPC .......... *C09D 5/103* (2013.01); *C09D 129/04* (2013.01); *C22C 30/00* (2013.01); *C23C 10/26* (2013.01)

(58) Field of Classification Search
CPC .......... C23C 4/06; C23C 4/067; C23C 4/073; C23C 4/08; C23C 10/10–10/60
See application file for complete search history.

(56) References Cited

U.S. PATENT DOCUMENTS

| | | | |
|---|---|---|---|
| 4,384,902 | A | 5/1983 | Crotty et al. |
| 4,761,189 | A | 8/1988 | Mady et al. |
| 5,304,257 | A | 4/1994 | Pearlstein et al. |
| 5,650,235 | A | 7/1997 | McMordie et al. |
| 5,922,409 | A | 7/1999 | McMordie et al. |
| 6,224,657 | B1 | 5/2001 | Myers et al. |

(Continued)

FOREIGN PATENT DOCUMENTS

| | | |
|---|---|---|
| CA | 2284510 A1 | 4/2000 |
| DE | 19807636 C1 | 11/1999 |

(Continued)

*Primary Examiner* — Lois L Zheng
(74) *Attorney, Agent, or Firm* — Abel Schillinger, LLP

(57) ABSTRACT

The present invention relates to a process for producing a diffusion layer for protecting temperature-stressed components, in particular of turbomachines, against oxidation and corrosion. The process comprises application of at least one slip to a component surface on which the diffusion layer is to be produced, and drying and/or hardening of the at least one slip by a heat treatment at a first temperature and diffusion heat treatment at a second temperature. The slip comprises Al-containing powder, Si-containing powder and a binder and also a Cr-containing powder which does not comprise any hexavalent chromium. In addition, the invention provides a corresponding slip.

20 Claims, 2 Drawing Sheets

(56) References Cited

U.S. PATENT DOCUMENTS

| | | |
|---|---|---|
| 6,440,499 B1 | 8/2002 | Wydra et al. |
| 6,444,054 B1 | 9/2002 | Kircher et al. |
| 7,270,852 B2 | 9/2007 | Kool et al. |
| 7,749,569 B2 | 7/2010 | Wilkins et al. |
| 7,896,962 B2 | 3/2011 | Kool et al. |
| 8,092,617 B2 | 1/2012 | Kramer et al. |
| 9,845,526 B2 * | 12/2017 | Stapel .................... C23C 10/18 |
| 2005/0031781 A1 | 2/2005 | Kool et al. |
| 2007/0187001 A1 | 8/2007 | Kramer et al. |
| 2007/0231586 A1 | 10/2007 | Albrecht et al. |
| 2009/0098394 A1 | 4/2009 | Skoog et al. |
| 2009/0169750 A1 | 7/2009 | Wilkins et al. |
| 2011/0058951 A1 * | 3/2011 | Walter .................... F01D 5/288 |
| | | 416/241 R |
| 2011/0300406 A1 | 12/2011 | Dees |
| 2014/0044986 A1 | 2/2014 | Pillhoefer et al. |
| 2014/0322555 A1 | 10/2014 | Walter |
| 2015/0079278 A1 | 3/2015 | Stapel et al. |
| 2015/0300200 A1 | 10/2015 | Walker |

| | | |
|---|---|---|
| 2016/0047029 A1 * | 2/2016 | Fairbourn ............... C23C 10/08 |
| | | 428/656 |

FOREIGN PATENT DOCUMENTS

| | | |
|---|---|---|
| DE | 19827620 A1 | 12/1999 |
| DE | 102008039969 A1 | 3/2010 |
| DE | 102012015586 A1 | 5/2014 |
| EP | 1505176 A1 | 2/2005 |
| EP | 2743369 A1 | 6/2014 |
| EP | 2796588 A1 | 10/2014 |
| FR | 1221455 A | 6/1960 |
| WO | 9407004 A1 | 3/1994 |
| WO | 9523243 A2 | 8/1995 |
| WO | 2005052211 A1 | 9/2005 |
| WO | 2007095517 A1 | 8/2007 |
| WO | 2010022698 A1 | 3/2010 |
| WO | 2010134917 A1 | 11/2010 |
| WO | 2010134918 A1 | 11/2010 |
| WO | 2013149609 A1 | 10/2013 |

* cited by examiner

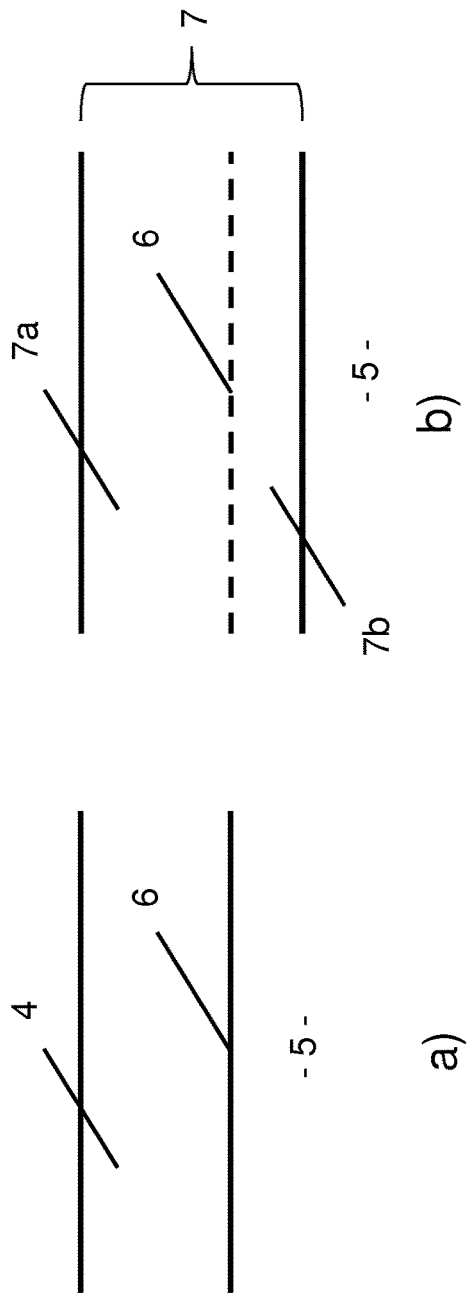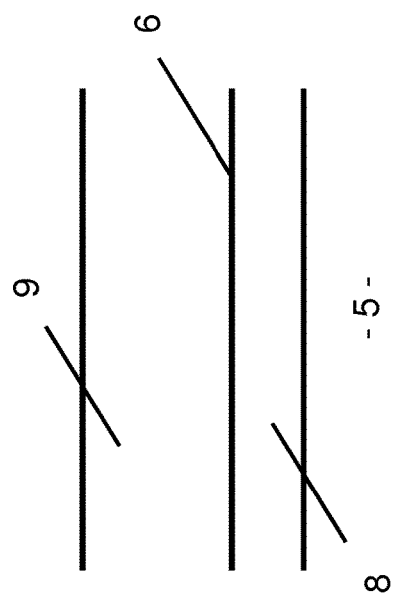

SLIP AND PROCESS FOR PRODUCING AN OXIDATION- AND CORROSION-RESISTANT DIFFUSION LAYER

CROSS-REFERENCE TO RELATED APPLICATIONS

The present application claims priority under 35 U.S.C. § 119 of German Patent Application No. 102014222024.6, filed Oct. 29, 2014, the entire disclosure of which is expressly incorporated by reference herein.

BACKGROUND OF THE INVENTION

1. Field of the Invention

The present invention relates to a slip and to a process for producing an oxidation- and corrosion-resistant diffusion layer.

2. Discussion of Background Information

In metallic components which are exposed to high temperatures, for example components of turbomachines in the form of stationary gas turbines or aircraft engines, the metallic surfaces have to be protected from oxidative and/or corrosive attack. Many different layer systems are known for this purpose.

Among other things, diffusion layers in which chemical elements diffuse into the metallic surface to be protected and/or deposit on the surface in order to give an increased concentration of the corresponding element on the surface to be protected are used. The element which has diffused in then provides, together with the alloy constituents of the base material, appropriate properties which allow the component to be operated at the desired high temperatures.

Thus, for example, providing aluminum diffusion layers on high-temperature materials such as cobalt- or nickel-based alloys is known, with the increased concentration of aluminum in the surface region of the corresponding alloys leading to a slowly growing aluminum oxide layer being formed in the case of high-temperature oxidative attack so as to protect the material from further damaging oxidative attack.

An appropriate aluminum diffusion layer can be produced, inter alia, by application of a slip comprising aluminum-containing powder particles which provide the aluminum for the diffusion process; after drying and/or hardening of the slip on the surface to be treated, the aluminum diffuses from the dried slip layer into the material during subsequent diffusion heat treatment. The application of such a slip by painting, dipping or spraying is very simple, and such a process is therefore of industrial interest for producing an aluminum diffusion layer. In particular, components can also be repaired in a simple way by the simple application.

Known slips for carrying out an aluminum diffusion process comprise aluminum-containing powder particles together with a binder which essentially provides the liquid phase for forming the slip. However, such a slip has to have such a constitution that the aluminum-containing powder is oxidized very little by the binder, so that the subsequent diffusion process is not made difficult by the presence of aluminum oxide. Accordingly, provision of additional chemical compounds such as chromates or dichromates and phosphates in the aqueous and acidic binders is known. Furthermore, silicon powder can be mixed in in order to assist the diffusion process.

Chromates in particular have been used in the past to increase not only the oxidation resistance but also the corrosion resistance of the metallic component which has been treated correspondingly and in addition also to inhibit the oxidation of the metallic aluminum in the slip. However, chromium(VI) compounds are extremely toxic and hazardous to health, and so attempts are increasingly being made to replace these components in the slip compositions. Examples are described in WO 2010/134917 A1, WO 2010/134918 A1, WO 2013/149609 A1, WO 2010/022698 A1 or DE 198 07 636 C1, the entire disclosures of which are incorporated by reference herein.

However, there continues to be a need for slips and processes for producing oxidation- and corrosion-resistant diffusion layers which make do without toxic Cr(VI) compounds which are hazardous to health while at the same time providing a balanced oxidation protection and corrosion protection for metallic components at high temperatures under aggressive environmental conditions.

In view of the foregoing, it would be desirable to have available a slip and a process for producing diffusion layers for protection of metallic components against oxidation and corrosion at high temperatures and under aggressive environmental conditions, in which the slip can be produced and applied simply and the process can be carried out simply and reliably without posing a hazard to the health of the user.

SUMMARY OF THE INVENTION

The present invention provides a slip for producing a diffusion layer for the protection of temperature-stressed components, in particular of turbomachines, against oxidation and corrosion. The slip comprises Al-containing powder, Si-containing powder and a binder, and further comprises a Cr-containing powder which does not comprise any hexavalent chromium.

In one aspect of the slip, the Al-containing powder may comprise powder particles which are coated with Si and/or the Al-containing powder may comprise technical-grade aluminum and/or one or more Al alloys and/or the Si-containing powder may comprise technical-grade silicon and/or one or more Si alloys and/or the Cr-containing powder may comprise technical-grade chromium and/or one or more Cr(II) compounds and/or one or more Cr(III) compounds, in particular one or more Cr(II) halides and/or one or more Cr(III) halides.

In another aspect of the slip of the present invention, the slip may comprise from 20% to 40% by weight of Al powder, from 5% to 8% by weight of Si powder, and from 1% to 20% by weight of Cr powder or from 1 to 25% by weight of one or more Cr(II) compounds and/or one or more Cr(III) compounds, one or more organic binders constituting the balance.

In yet another aspect of the slip, the powder particles may have an average or maximum particle size of less than or equal to about 100 μm, e.g., less than or equal to about 40 μm.

In a still further aspect of the slip, the binder may comprise at least one component from the group of organic materials, water, alcohols, polyvinyl alcohol, glycol compounds and thickeners. For example, the binder may comprise water, at least one glycol compound and at least one thickener. Also by way of example, the thickener may be selected from pectins, guar, carob seed flour, carrageenan, cellulose ethers, polyvinyl alcohol, silicates.

The present invention also provides a process for producing a diffusion layer for protecting a temperature-stressed component, in particular of a turbomachine, against oxidation and corrosion. The process comprises:

application of at least one slip to a component surface on which the diffusion layer is to be produced, drying and/or hardening the at least one slip by means of a heat treatment at a first temperature and diffusion heat treatment at a second temperature.

The slip may be the slip of the present invention as set forth above (including the various aspects thereof). Alternatively or additionally, a base slip comprising at least one halide, a Cr-containing powder and a binder is applied in at least one first layer, and at least one second layer is applied to the first layer using a slip comprising Al-containing powder and Si-containing powder and a binder. Neither the Cr-containing powder nor the halide comprises hexavalent chromium.

In one aspect of the process of the present invention, the slip of the second layer may be applied onto the base slip of the first layer before or after a heat treatment of the base slip or before or after a heat treatment for reactive bonding of the base slip or before or after a diffusion heat treatment of the base slip.

In another aspect of the process, the halide of the base slip may comprise a metal chloride compound or a chromium halogen compound, in particular $CrCl_2$ and/or $CrCl_3$. For example, the base slip may comprise from 0.1% to 10% by weight of $CrCl_2$ and/or $CrCl_3$ and from 25% to 95% by weight of binder and Cr particles and/or chromium alloy particles as balance.

In yet another aspect of the process, the base slip may comprise a binder having an acrylic basis or a glycol basis or a polyvinyl basis.

In a still further aspect of the process, the heat treatment of the slip or base slip may be carried out at a temperature in the range from about 50° C. to about 600° C., e.g., from about 100° C. to about 300° C., in particular from about 120° C. to about 220° C., and/or for a time in the range from about 5 minutes to about 240 minutes.

In another aspect, the heat treatment of the base slip for reactive bonding may be carried out before the diffusion heat treatment and/or at a temperature in the range from about 900° C. to about 1160° C. and/or for a time in the range from about 15 minutes to about 15 hours.

In another aspect of the process, the diffusion heat treatment of the base slip and/or the slip may be carried out for a time in the range from about 30 minutes to about 12 hours, e.g., from about 1 to about 8 hours, and/or at a temperature in the range from about 800° C. to about 1200° C., e.g., from about 825° C. to about 1000° C., particularly from about 850° C. to about 950° C. and/or the diffusion heat treatment of the base slip and/or of the slip may be carried out in a halide atmosphere, a hydrogen atmosphere or an inert gas atmosphere and/or at a pressure in the range from ambient pressure to an industrial vacuum, e.g., at a pressure of less than or equal to 1 mbar, in particular less than or equal to 0.01 mbar. The hydrogen atmosphere or the inert gas atmosphere may comprise a gaseous addition of metal halides or an aerosol comprising metal halides and the metal halides may comprise, for example, $CrCl_2$ and/or $CrCl_3$.

In another aspect of the process of the present invention, the slip of the second layer, which is applied onto the base slip, may be the slip of the present invention as set forth above (including the various aspects thereof).

In another aspect of the process, the surface to be treated may be blasted with particles, e.g., aluminum oxide particles, before application of the slip or of the base slip.

In yet another aspect, the process may be carried out in such a way that the diffusion layer on the surface and/or averaged over the thickness of the diffusion layer comprises from 10% to 30% by weight of Cr, from 20% to 35% by weight of Al and from 5% to 20% by weight of Si and/or in such a way that the diffusion layer has a thickness of from about 10 μm to about 200 μm, e.g., from about 20 μm to about 100 μm.

In a still further aspect, the process of the present invention may be used in the coating of Ni- or Co-based superalloys, in particular of components, e.g., blades of gas turbines or aircraft engines, for example, for the purpose of repair.

As set forth above, the invention proposes providing a diffusion layer on a component to be protected, for example a component of a turbomachine, where significant proportions of chromium, aluminum and silicon are present in the diffusion layer.

This is achieved according to a first aspect of the present invention, by a novel slip being applied to an appropriate component and, after drying and/or hardening of the slip, the latter is subjected to a diffusion heat treatment so as to form a diffusion layer having corresponding proportions of chromium, aluminum and silicon.

The slip used for this purpose comprises at least one Al-containing powder, at least one Si-containing powder and at least one Cr-containing powder and a binder, where the Cr-containing powder does not contain any hexavalent chromium and is therefore toxicologically unproblematic.

The Al-containing powder can comprise powder particles composed of technical-grade aluminum and/or aluminum alloys and also Al-containing powder particles which are coated with silicon.

The Si-containing powder can correspondingly be made up of technical-grade silicon and/or silicon alloys.

The Cr-containing powder can be made up of technical-grade chromium, chromium alloy and/or trivalent and/or divalent chromium compounds, in particular chromium halides such as $CrCl_2$ or preferably $CrCl_3$ or hydrates thereof.

In particular, the respective powders can comprise a plurality of different powders of the type mentioned, i.e., for example, Al-containing powder can comprise powder particles composed of technical-grade aluminum and of one or more different aluminum alloys. The same applies analogously to the Si-containing powder and the Cr-containing powder.

An advantageous slip can comprise from 20% to 40% by weight of Al-containing powder, in particular aluminum powder, from 5% to 8% by weight of Si-containing powder, in particular silicon powder, and from 1% to 30% by weight of Cr-containing powder, in particular from 1% to 20% by weight of chromium powder or from 1% to 25% by weight of chromium(II) compounds and/or chromium (III) compounds, and also organic binder as balance.

The powder particles of the various powders used in the slip can be selected so that they have an average or maximum particle size of ≤100 μm, preferably ≤40 μm, so that the duration of the diffusion heat treatment can be limited.

The binder can comprise one or more components from the group of organic materials, water, alcohols, glycol compounds and thickeners.

In an advantageous embodiment, the binder can comprise at least one alcohol or glycol ether acetate and at least one thickener.

The thickener of the binder can comprise one or more components from the group consisting of pectins, guar, carob seed flour, carrageenan, cellulose ethers, polyvinyl alcohol and silicates. In particular, the binder can comprise glycol ether acetate in an amount of from 90% by weight to 100% by weight and thickener in an amount of from 1% by weight to 2% by weight, based on the binder, so that the thickener (e.g. polyvinyl alcohol) makes up less than or equal to 5% by weight of the slip.

According to a further aspect of the present invention, for which protection is sought both independently and in combination with other aspects of the invention, a process for producing a diffusion layer, in which an at least two-part layer composed of at least one base slip and a slip for producing the diffusion layer having significant proportions of Cr, Al and Si is used, is proposed. Both the base slip and also the slip used here, which may be different from the previously described slip, are free of hexavalent chromium in order to limit the toxicity but equally well to create an oxidation- and corrosion-resistant protective layer comprising Cr, Al and Si.

Correspondingly, at least one base slip can firstly be applied in one or more sublayers to form a first layer on the component to be coated in the process. After application of the base slip, the base slip can be subjected to a heat treatment in order to dry the base slip. However, the application of at least one slip onto the first layer composed of base slip can also be carried out before a heat treatment is carried out for drying, so that the heat treatment for drying can be carried out simultaneously for the base slip and the slip. In addition, it is also possible to carry out a heat treatment for reactive bonding of the base slip before or after application of the at least one slip in one or more sublayers to form a second layer on the first layer of base slip.

The same applies to the diffusion heat treatment which can be carried out for the base slip independently of a diffusion heat treatment for the slip layer. However, preference is given to carrying out the diffusion heat treatment for the base slip and for the slip simultaneously in one heat treatment. However, in particular embodiments, it can be useful to carry out at least one partial diffusion heat treatment for the base slip beforehand. Accordingly, the second layer composed of one or more sublayers of slip can be applied before or after a corresponding diffusion heat treatment is carried out for the base slip.

The application of the slip and/or of the base slip can, like the application of the slip in the variant without an underlying base slip layer, be carried out by painting, brushing, dipping of the corresponding component into the base slip and/or slip or by spraying the slip and/or the base slip onto the component surface.

The base slip comprises at least a halide, a Cr-containing powder and a binder.

The halide of the base slip can be a metal halide, in particular a metal chloride compound or a chromium-halogen compound such as $CrCl_2$ or preferably $CrCl_3$ or hydrates thereof.

The base slip can comprise, in particular, from 0.1% to 10% by weight of $CrCl_2$ and/or $CrCl_3$ and from 25 to 95% by weight of binder and also chromium particles and/or chromium alloy particles as balance, where the binder of the base slip can have an acrylic basis or a glycol basis or a polyvinyl basis. For example, the binder can comprise acrylic esters, methacrylic esters, a methylcellulose compound, a polysaccharide, polyvinyl alcohol, polyvinyl ether, a polyvinyl acetate, a polyvinylpyrrolidone or a colloidal silica mixture. The base slip can be provided as an aqueous or nonaqueous dispersion.

The at least one slip which is applied in the second layer on the base slip layer comprises Al-containing powder and Si-containing powder and also a binder, with the slip being able to correspond to the slip which is used for forming a diffusion layer according to the invention without prior application of a base slip. In addition, the constituents of the slip which is provided for application onto the base slip layer can, except for the absence of Cr-containing powder, correspond to the constituents of the slip which is applied without base slip layer, in particular in respect of the Al-containing powder and the Si-containing powder and also the binder.

The heat treatment of the slip and/or the base slip for drying at a first temperature can be carried out in the range from about 50° C. to about 600° C., preferably from about 100° C. to about 300° C., in particular from about 120° C. to about 220° C., for a time in the range from about 5 minutes to about 4 hours. In the case of application of the base slip and the slip in one or more sublayers, drying can in each case likewise be carried out between the application of the individual sublayers; this drying can be carried out for the same time or a shorter time and/or at the same or lower temperatures, for example at from about 80° C. to about 150° C.

The base slip can be subjected to a heat treatment for reactive bonding before the diffusion heat treatment, with the heat treatment for reactive bonding being able to be carried out at a temperature in the range from about 900° C. to about 1160° C. for a time in the range from about 1 hour to about 15 hours. However, a multistage heat treatment at two or more different temperatures in order to effect combined reactive bonding and diffusion heat treatment can also be carried out, in particular in the variant in which the base slip and the slip are subjected to a joint diffusion heat treatment.

In both variants, i.e. the variant in which the slip is applied without a base slip layer and that with a base slip layer, the diffusion heat treatment of the base slip and/or the slip can be carried out for a time in the range from about 1 hour to about 12 hours, in particular from about 1 hour to about 8 hours, at a temperature in the range from about 800° C. to about 1200° C., in particular from about 825° C. to about 1000° C., preferably from about 850° C. to about 950° C.

The diffusion heat treatment of the base slip and/or of the slip can be carried out in an inert gas atmosphere, for example under argon, and/or under reduced pressure, where the term vacuum refers to an industrial vacuum having a pressure of ≤1 mbar, in particular ≤0.01 mbar. In addition, it is also possible to carry out the diffusion heat treatment of the base slip and/or of the slip in a halide atmosphere or a hydrogen atmosphere, with a gaseous addition of metal halides or an aerosol comprising metal halides being able to be provided, especially in the case of a hydrogen atmosphere or an inert gas atmosphere. Here, the metal halides can be formed by $CrCl_2$ and/or $CrCl_3$.

The component surface of the component to be coated can be blasted with particles, in particular with aluminum oxide particles, in order to remove oxides present on the surface, at least in the coating region, before application of the slip or the base slip.

The processes described above are carried out appropriately in such a way that the diffusion layer on the surface and/or averaged over the thickness of the diffusion layer comprises from 10% to 30% by weight of chromium, from 20% to 35% by weight of aluminum and from 5% to 20% by weight of silicon.

In addition, the diffusion layer can have a thickness of from about 10 μm to about 200 μm, in particular from about 20 μm to about 100 μm.

The process is suitable for coating nickel- or cobalt-based alloys, in particular base superalloys of components, in particular blades of gas turbines or aircraft engines, in order to form a protective layer which is resistant to oxidation and corrosion in a simple, reproducible and reliable process without posing a hazard to the health of the user, with the process being able to be used, in particular, in the repair of corresponding components.

BRIEF DESCRIPTION OF THE DRAWINGS

The accompanying drawings show, purely schematically.

DETAILED DESCRIPTION OF EMBODIMENTS

Figure 1:
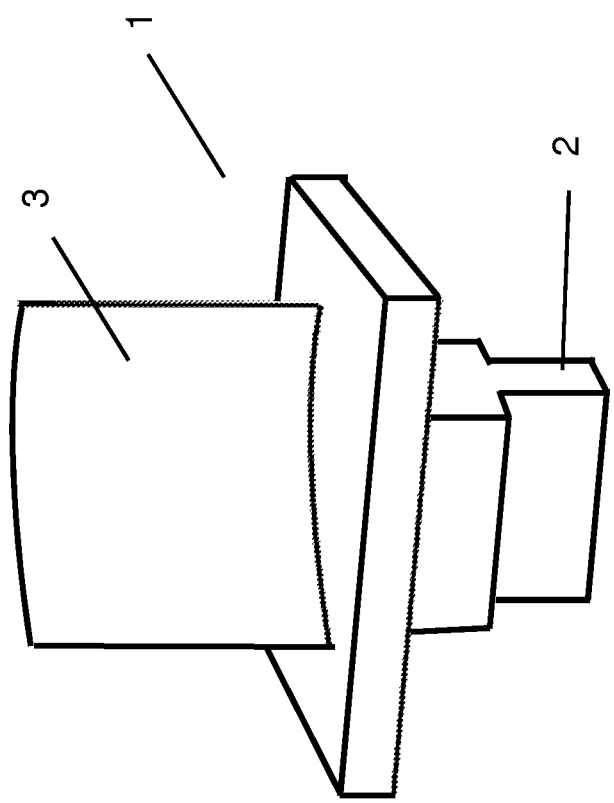
FIG. 1 a depiction of a rotor blade of an aircraft engine, in the case of which the present invention can be employed, FIG. 2 in the sub-figures a) and b), partial cross-sectional views through the surface region of a component to be protected by a diffusion layer, with an applied slip layer (sub-figure a) and the finished diffusion layer (sub-figure b), and FIG. 3 a partial cross-sectional view through a further surface region having an applied base slip layer and a slip layer arranged thereon.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

FIG. 1 shows, in a purely schematic depiction, a view of a rotor blade 1 of an aircraft engine having a blade foot 2 and a blade 3, to which a diffusion coating according to the invention for protecting the rotor blade 1 against oxidative and corrosive attack can be applied. Here, the diffusion layer can be provided over the entire surface region of the component or only in particular regions of the component, for example on the blade 3 or on the blade foot 2.

FIG. 2 shows a partial section through a surface of a component 5 to be coated, for example the rotor blade 1 shown in FIG. 1, with an applied slip layer 4 which has been applied to the component surface 6 by painting, brushing, spraying, dipping or the like being able to be seen in sub-figure a).

The corresponding slip layer 4 is firstly dried in a heat treatment at a first temperature in the temperature range from about 120° C. to about 220° C. for from a few minutes to some hours, for example about half an hour, in order to be subjected subsequently to a diffusion heat treatment at a second temperature in the temperature range from about 800° C. to about 1000° C. in an argon atmosphere or an industrial vacuum for from about 1 to about 8 hours so as to produce the diffusion layer. In the case of a vacuum atmosphere, the pressure can be selected in the range from about 1 to about $10^{-3}$ mbar.

FIG. 2b) shows the diffusion layer 7 having the sublayers 7a and 7b, where the sublayer 7b has been formed by diffusion of the material from the slip 4 into the component material. The original component surface 6 is shown as a broken line in the depiction in FIG. 2b). The outer sublayer 7a comprises the material of the slip layer 4 together with material from the component base material which has diffused outward during the diffusion heat treatment. Accordingly, the composition of the diffusion layer depends on the composition of the component base material, but the diffusion coating is carried out in such a way that on the surface and/or averaged over the thickness of the diffusion layer 7 the proportion of chromium is in the range from 10% to 30% by weight, the proportion of aluminum is in the range from 20% to 35% by weight and the proportion of silicon is in the range from 5% to 10% by weight. Further constituents can be formed by elements such as nickel and cobalt when coating has been carried out, for example, on a nickel- or cobalt-based material.

In the case of the slip layer 4, a slip comprising from 20% to 40% by weight of aluminum powder, from 5% to 8% by weight of silicon powder and from 1% to 20% by weight of chromium powder or from 1% to 25% by weight of chromium(II) and/or chromium(III) compounds and an organic binder as balance was used. The chromium(II) and/or chromium(III) compounds can be essentially chromium halides, in particular $CrCl_2$ or $CrCl_3$ or hydrates thereof.

FIG. 3 shows an alternative embodiment in which the desired composition of the diffusion layer comprising from 10% to 30% by weight of chromium, from 20% to 35% by weight of aluminum and from 5% to 20% by weight of silicon is achieved by firstly applying two different layers to the component 5 to be coated in order likewise to obtain the desired diffusion layer in a subsequent diffusion heat treatment. FIG. 3 shows, in a partial sectional view of a component surface 6 of the component 5 to be coated, an applied base slip layer 8 and a slip layer 9 arranged thereon.

The base slip layer 8 can contain from 0.1% to 10% by weight of $CrCl_2$ and/or $CrCl_3$ and also from 25% to 95% by weight of binder and chromium particles or chromium alloy particles as balance.

After the base slip has been dried at a temperature in the range from about 50° C. to about 600° C., preferably from about 100° C. to about 300° C. or from about 120° C. to about 220° C., for from a few minutes to some hours, in particular from about 1 to about 4 hours, a slip layer 9 comprising an Al-containing powder and an Si-containing powder and also a binder is applied. Such a slip can comprise, for example, from 4% to 50% by weight of glycol ether acetate, from 0.5% by weight to 1% by weight of thickener, from 30% by weight to 40% by weight of aluminum powder and from 6% to 7% by weight of silicon powder, where the aluminum powder can be an uncoated aluminum powder, a silicon-coated aluminum powder or a mixture of uncoated and silicon-coated aluminum powders.

The slip layer of the example of FIG. 3 can, like the slip layer 4 of the example of FIG. 2, be applied in a plurality of sublayers, with intermediate drying, for example at temperatures in the range from about 80° C. to about 150° C., being able to be carried out after the spraying-on, dipping, brushing-on or painting-on of the respective slip sublayer.

After application of the slip layer 9, the slip structure comprising the base slip layer 8 and the slip layer 9 is likewise subjected to a diffusion heat treatment, which can be carried out in the temperature range from about 800° C. to about 1200° C. for a time of from 1 to 8 hours in a vacuum or a protective gas atmosphere such as Ar.

Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE NUMERALS

1 Rotor blade
2 Blade foot
3 Blade
4 Slip layer
5 Component
6 Component surface
7 Diffusion layer
7a Outer diffusion layer
7b Inner diffusion layer
8 Base slip layer
9 Slip layer

What is claimed is:

1. A process for producing a diffusion layer for protecting a temperature-stressed component against oxidation and corrosion, wherein the method comprises:
    application of at least one slip to a component surface on which the diffusion layer is to be produced,
    drying and/or hardening of the at least one slip by a heat treatment at a first temperature and diffusion heat treatment at a second temperature;
and wherein a base slip comprising at least one halide, a Cr-containing powder and a binder is applied in at least one first layer and at least one second layer is applied to the first layer using a slip comprising Al-containing powder, Si-containing powder and a binder, neither the Cr-containing powder nor the halide comprising hexavalent chromium.

2. The process of claim 1, wherein the second layer is applied onto the base slip of the first layer before or after a heat treatment of the base slip or before or after a heat treatment for reactive bonding of the base slip or before or after a diffusion heat treatment of the base slip.

3. The process of claim 1, wherein the halide of the base slip comprises a metal chloride compound or chromium halogen compound.

4. The process of claim 1, wherein the base slip comprises from 0.1% to 10% by weight of $CrCl_2$ and/or $CrCl_3$ and from 25% to 95% by weight of binder, the balance being Cr particles and/or chromium alloy particles.

5. The process of claim 1, wherein the base slip comprises a binder having an acrylic basis or a glycol basis or a polyvinyl basis.

6. The process of claim 2, wherein the heat treatment of the base slip is carried out at a temperature in ranging from 50° C. to 600° C. and/or for a time in ranging from 5 minutes to 240 minutes.

7. The process of claim 2, wherein the heat treatment of the base slip for reactive bonding is carried out before the diffusion heat treatment and/or at a temperature ranging from 900° C. to 1160° C. and/or for a time ranging from 15 minutes to 15 hours.

8. The process of claim 1, wherein the diffusion heat treatment of the base slip is carried out for a time ranging from 30 minutes to 12 hours and/or at a temperature ranging from 800° C. to 1200° C.

9. The process of claim 1, wherein the diffusion heat treatment of the base slip is carried out in a halide atmosphere, a hydrogen atmosphere or an inert gas atmosphere and/or at a pressure ranging from ambient pressure to an industrial vacuum.

10. The process of claim 9, wherein the hydrogen atmosphere or the inert gas atmosphere comprises a gaseous addition of metal halides or an aerosol comprising metal halides and the metal halides comprise $CrCl_2$ and/or $CrCl_3$.

11. The process of claim 1, wherein the slip of the second layer, which is applied onto the base slip, comprises a slip which comprises Al-containing powder, Si-containing powder, Cr-containing powder which does not comprise any hexavalent chromium, and a binder.

12. The process of claim 1, wherein the surface to be treated is blasted with particles before application of the base slip.

13. The process of claim 1, wherein the process is carried out in such a way that the diffusion layer on the surface and/or averaged over the thickness of the diffusion layer comprises from 10% to 30% by weight of Cr, from 20% to 35% by weight of Al and from 5% to 20% by weight of Si.

14. The process of claim 1, wherein the process is carried out in such a way that the diffusion layer has a thickness of from 10 μm to 200 μm.

15. A process for producing a diffusion layer for protecting a temperature-stressed component against oxidation and corrosion, wherein the method comprises:
    application of at least one slip to a component surface on which the diffusion layer is to be produced,
    drying and/or hardening of the at least one slip by a heat treatment at a first temperature and diffusion heat treatment at a second temperature;
and wherein the at least one slip comprises from 20% to 40% by weight of Al powder, from 5% to 8% by weight of Si powder, and from 1% to 20% by weight of Cr powder or from 1% to 25% by weight of Cr(II) compounds and/or Cr(III) compounds, the balance being one or more organic binders.

16. The process of claim 15, wherein the at least one slip comprises from 1% to 25% by weight of Cr(II) compounds and/or Cr(III) compounds.

17. The process of claim 15, wherein the heat treatment of the at least one slip is carried out at a temperature in ranging from 50° C. to 600° C. and/or for a time in ranging from 5 minutes to 240 minutes.

18. The process of claim 15, wherein the diffusion heat treatment of the at least one slip is carried out for a time ranging from 30 minutes to 12 hours and/or at a temperature ranging from 800° C. to 1200° C.

19. The process of claim 15, wherein the diffusion heat treatment of the at least one slip is carried out in a halide atmosphere, a hydrogen atmosphere or an inert gas atmosphere and/or at a pressure ranging from ambient pressure to an industrial vacuum.

20. The process of claim 19, wherein the hydrogen atmosphere or the inert gas atmosphere comprises a gaseous addition of metal halides or an aerosol comprising metal halides and the metal halides comprise $CrCl_2$ and/or $CrCl_3$.

* * * * *